US010022869B2

(12) United States Patent
Liu et al.

(10) Patent No.: US 10,022,869 B2
(45) Date of Patent: Jul. 17, 2018

(54) ROBOT CONTROL SYSTEM AND METHOD

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Yu-Ching Liu, New Taipei (TW); Hsi-Che Chang, New Taipei (TW); Yu-Nan Lin, New Taipei (TW); Wei-Da Yang, New Taipei (TW); Po-Lin Su, New Taipei (TW); Li Chen, Zhengzhou (CN); Yue-Kai Cao, Zhengzhou (CN); Bo Ning, Zhengzhou (CN); Guang-Chen Liang, Zhengzhou (CN); Jiang-Tao Zheng, Zhengzhou (CN)

(73) Assignees: HONGFUJIN PRECISION ELECTRONICS (ZHENGZHOU), Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 79 days.

(21) Appl. No.: 15/140,484

(22) Filed: Apr. 28, 2016

(65) Prior Publication Data

US 2017/0197309 A1    Jul. 13, 2017

(30) Foreign Application Priority Data

Jan. 7, 2016  (CN) .......................... 2016 1 0007741

(51) Int. Cl.
*B25J 9/16* (2006.01)

(52) U.S. Cl.
CPC .................................. *B25J 9/1664* (2013.01)

(58) Field of Classification Search
None
See application file for complete search history.

(56) References Cited

U.S. PATENT DOCUMENTS

| 2002/0188379 | A1* | 12/2002 | McGee ................. B25J 9/1692 700/245 |
| 2003/0110649 | A1* | 6/2003 | Hudgens ........... H01L 21/67259 33/286 |
| 2005/0171728 | A1* | 8/2005 | Rogele ................ G05B 19/401 702/152 |
| 2007/0138374 | A1* | 6/2007 | Nishibashi ............ B25J 9/1623 250/208.1 |

(Continued)

*Primary Examiner* — Ryan J Rink
(74) *Attorney, Agent, or Firm* — ScienBiziP, P.C.

(57) ABSTRACT

A robot control system on a platform which can carry target objects employs a coordinate system including X, Y, and Z axes. A plane including the X and Y axis is parallel with a panel including the platform. After the coordinate system is created, a reminder is displayed and a guiding tool is placed in a position on the platform where the target objects are located, and a fastening tool for use with the guiding tool is arranged on hand of the robot. A location of the fastening tool relative to the guiding tool is adjusted according to a predefined rule. When the location of the fastening tool relative to the guiding tool is correctly adjusted, a position of the end effect of the robot is determined according to the location of the fastening tool and the relevant coordinates are stored as data.

10 Claims, 9 Drawing Sheets

(56) References Cited

U.S. PATENT DOCUMENTS

| | | | |
|---|---|---|---|
| 2007/0150100 A1* | 6/2007 | Saraliev | B25J 9/1692 700/245 |
| 2008/0188986 A1* | 8/2008 | Hoppe | B25J 9/1692 700/263 |
| 2009/0096148 A1* | 4/2009 | Usui | B23Q 41/02 269/45 |
| 2009/0235547 A1* | 9/2009 | Hellier | G01B 21/04 33/503 |
| 2010/0161125 A1* | 6/2010 | Aoba | B25J 9/1692 700/254 |
| 2010/0210971 A1* | 8/2010 | Shabram | G01N 3/08 600/587 |
| 2011/0015774 A1* | 1/2011 | Owaki | H01L 21/68 700/110 |
| 2011/0033254 A1* | 2/2011 | Abrams | B23Q 17/22 408/1 R |
| 2011/0046782 A1* | 2/2011 | Fixell | B25J 9/1692 700/251 |
| 2011/0270443 A1* | 11/2011 | Kamiya | G05B 19/401 700/245 |
| 2012/0002216 A1* | 1/2012 | Shibata | B25J 9/1692 356/614 |
| 2012/0072005 A1* | 3/2012 | Doki | H01L 21/67259 700/114 |
| 2012/0078418 A1* | 3/2012 | Borm | B25J 9/1692 700/254 |
| 2012/0116586 A1* | 5/2012 | Fujii | G05B 19/42 700/250 |
| 2013/0178980 A1* | 7/2013 | Chemouny | B25J 9/1671 700/255 |
| 2014/0116847 A1* | 5/2014 | Mutsuji | H01L 21/68728 198/468.3 |
| 2014/0156072 A1* | 6/2014 | Ban | B25J 9/1697 700/254 |
| 2015/0045953 A1* | 2/2015 | Nagai | B25J 9/1692 700/258 |
| 2016/0096205 A1* | 4/2016 | Kato | H01L 21/67046 134/21 |
| 2016/0184986 A1* | 6/2016 | Procyshyn | B25J 9/0009 74/490.05 |
| 2017/0151666 A1* | 6/2017 | Kobayashi | B25J 9/1633 |
| 2017/0326739 A1* | 11/2017 | Nakazato | B25J 19/023 |
| 2017/0341229 A1* | 11/2017 | Hwang | B25J 9/163 |

* cited by examiner

ROBOT CONTROL SYSTEM AND METHOD

FIELD

The subject matter herein generally relates to a robot control systems and method.

BACKGROUND

Robots are widely used in computer aided manufacturing (CAM) and used for processing and manufacturing all kinds of components of the computer. A common task of robots is to use the robotic arm to pick or grasp objects.

BRIEF DESCRIPTION OF THE DRAWINGS

Implementations of the present technology will now be described, by way of example only, with reference to the attached figures.

DETAILED DESCRIPTION

Figure 1:
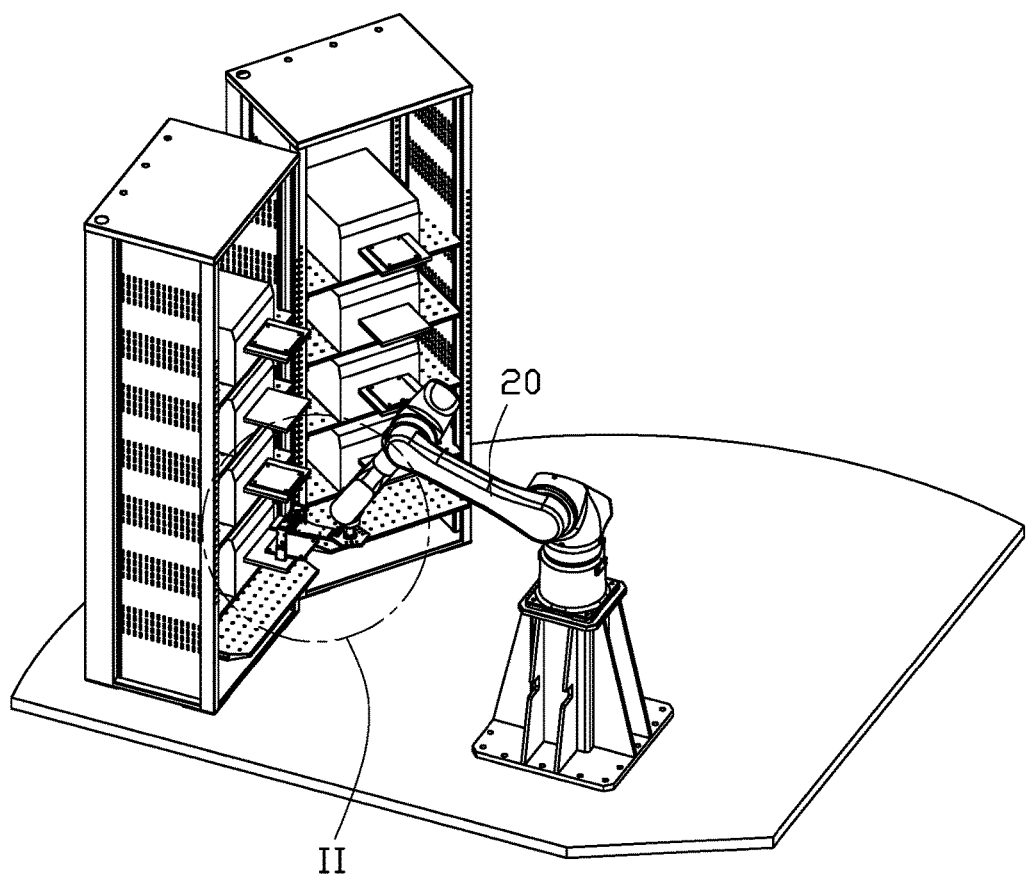
FIG. 1 is a isometric diagram of an embodiment of a robot of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or portionship in a so-described combination, group, series, and the like.

Figure 2:
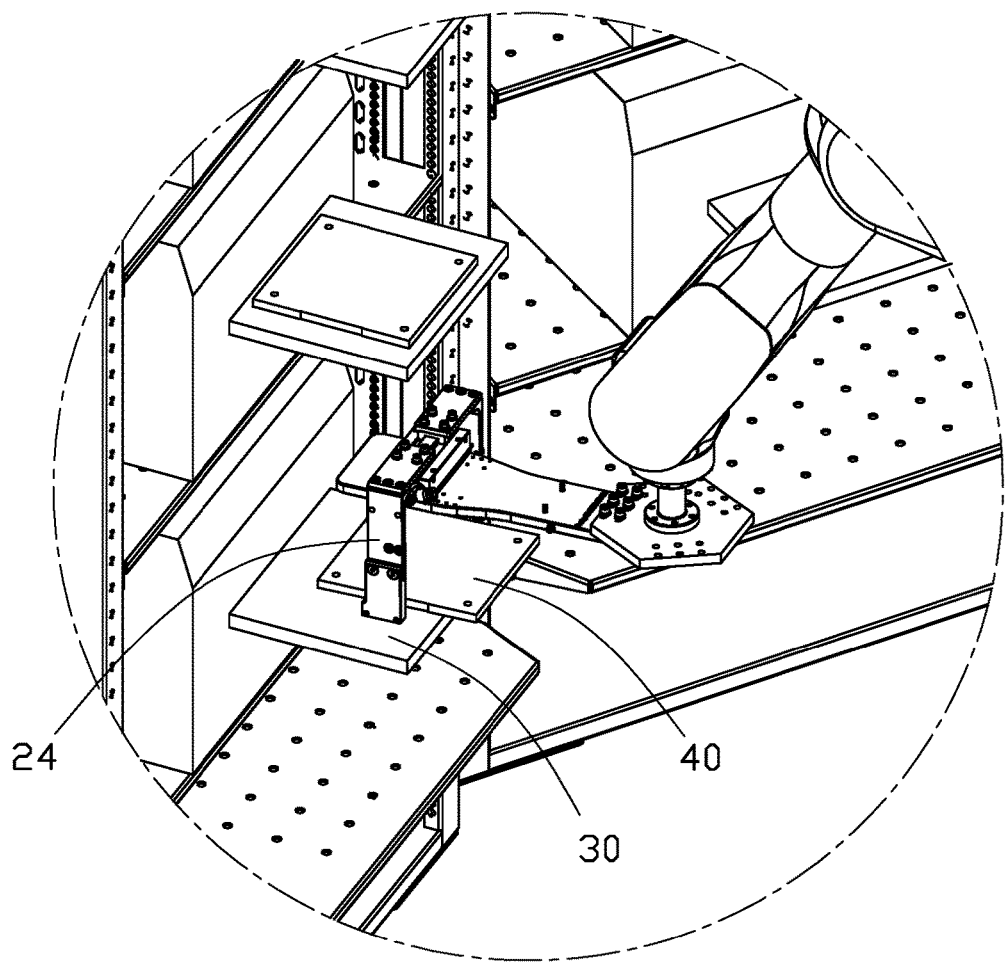
FIG. 2 is an enlarged view of circled portion II of FIG. 1.

FIGS. 1 and 2 illustrate an embodiment of a robot 20 of the present disclosure which can grasp a target object. The robot 20 in accordance with an exemplary embodiment comprises a robotic arm 24, the robotic arm 24 of the robot 20 is configured for grasping. The robot 20 controls the robotic arm 24 to execute operations. In at least one embodiment, the robot 20 can comprise two robotic arms 24. The robot 20 can transport the target object 40 to a platform 30 or can grasp and lift the target object 40 from the platform 30.

Figure 3:
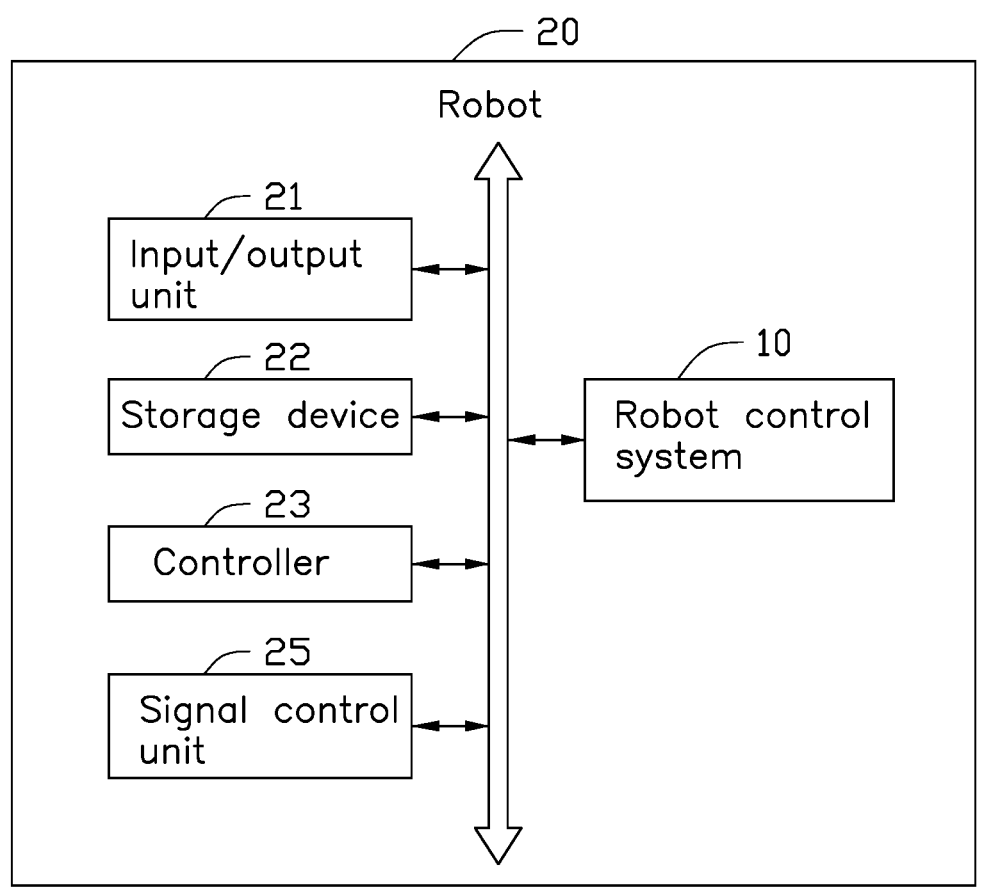
FIG. 3 is a block diagram of an embodiment of a robot control system of the present disclosure.

FIG. 3 illustrates a control system 10 installed in the robot 20. In the illustrated embodiment, the robot 20 further comprises an input/output unit 21, a storage device 22, and a controller 23. The input/output unit 21 is configured to receive user commands, and show information to the user. The storage device 22 is configured to store program code and data of the robot control system 10. The controller 23 controls the robot 20.

In the illustrated embodiment, the input/output unit 21 can be a touch screen with input and output functions. The storage device 22 can be a secure digital card or a flash memory card. The controller 23 can be a central processing unit (CPU) or a digital signal processor (DSP).

In the robot control system 10, a coordinate system is created based on the platform 30 which supports the target objects 40. The coordinate system includes X, Y, and Z axes. A plane including the X and Y axis is parallel with a panel including the platform 30. After the coordinate system is created, a reminder message is generated. A guiding tool 71 (shown in FIG. 8) is placed on the platform 30 where the target objects 40 are located, and a fastening tool 72 (shown in FIG. 8) used with the guiding tool 71 is arranged on robotic arm 24 of the robot 20, in response to the reminder message. A location of the fastening tool 72 relative to the guiding tool 71 is adjusted according to a predefined rule. When the location of the fastening tool 72 relative to the guiding tool 71 is corrected, a position of the robotic arm 24 of the robot 20 is determined according to the location of the fastening tool 72.

Figure 4:
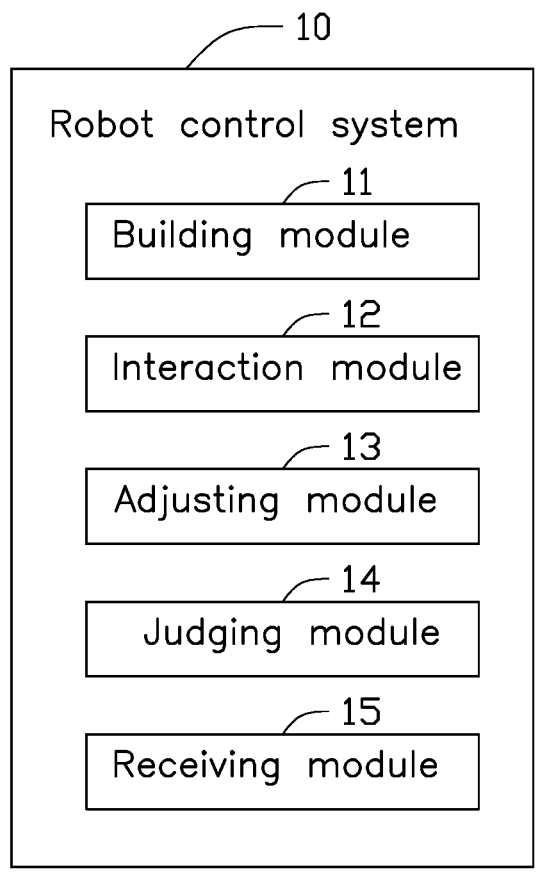
FIG. 4 is a block diagram of the function modules of the robot control system of the present disclosure.

FIG. 4 illustrates a function modules diagram in accordance with an exemplary embodiment. The robot control system 10 comprises a building module 11, an interaction module 12, an adjusting module 13, a judging module 14, and a receiving module 15. The modules mentioned in the present disclosure refer to a specific program command segments which can be executed by the controller 23 of the robot 20.

Figure 5:
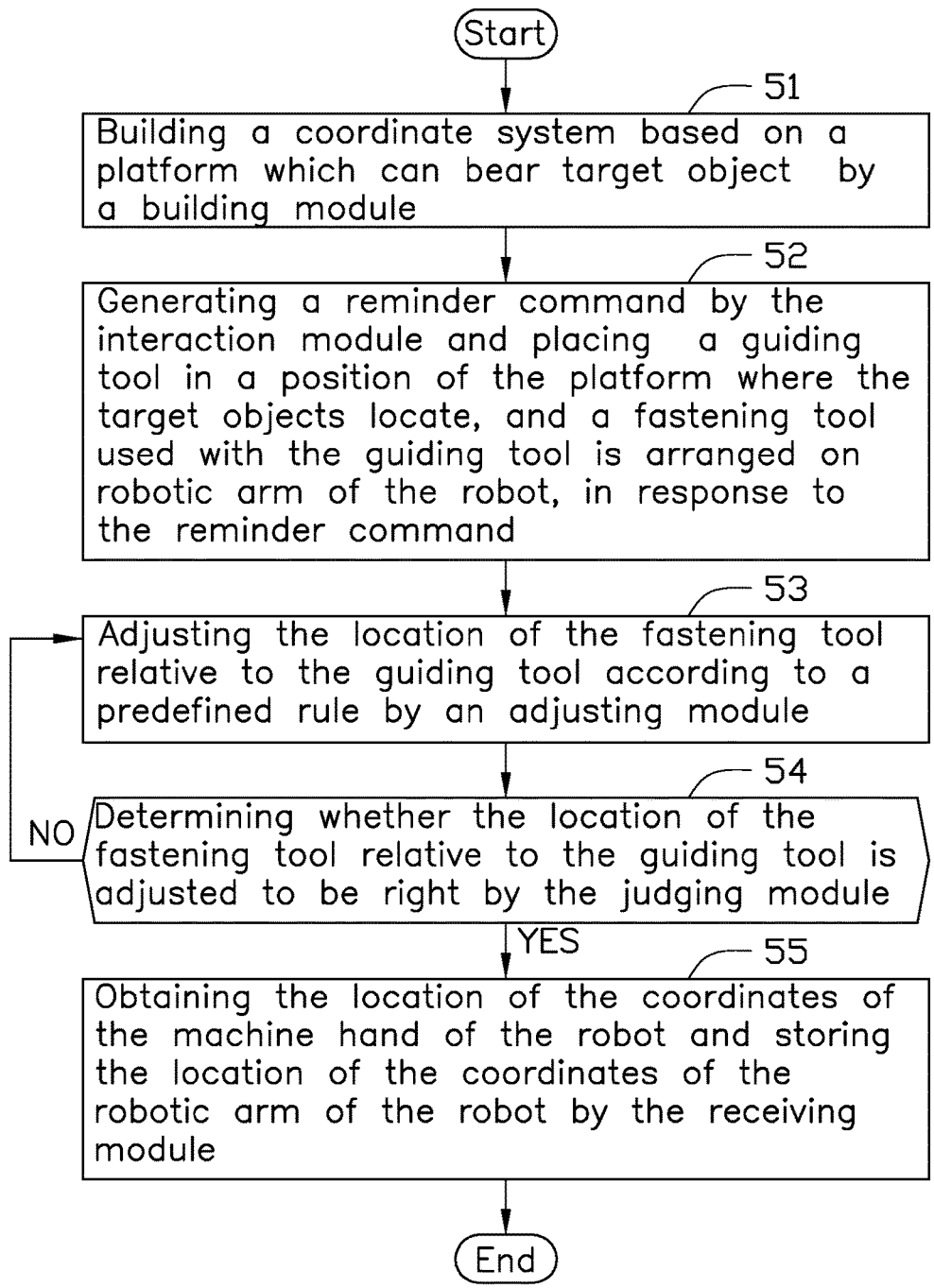
FIG. 5 is a flow chart of an embodiment of a robot control method.

FIG. 5 shows a flowchart presented in accordance with the illustrated embodiment. The example method is provided by way of example, as there are a variety of ways to carry out the method. The method described below can be carried out using the configurations illustrated in FIG. 1, for example, and various elements of these figures are referenced in explaining the example method. Blocks shown in FIG. 5 represent one or more processes, methods, or subroutines, carried out in the test method. Furthermore, the illustrated order of blocks is by example only and the order of the blocks can change. Additional blocks may be added or fewer blocks may be utilized without departing from this disclosure. The robot control method can begin at block 51.

At block 51, in the building module 11, a coordinate system is created based on supportive platform 30 bearing target objects 40. The coordinate system includes X, Y, and Z axes. A plane including the X and Y axis is parallel with a panel including the platform 30.

In the illustrated embodiment, in the building module 11, the coordinate system is created based on the location of a positioning mold 60 (shown in FIG. 6) of the platform 30.

Figure 6:
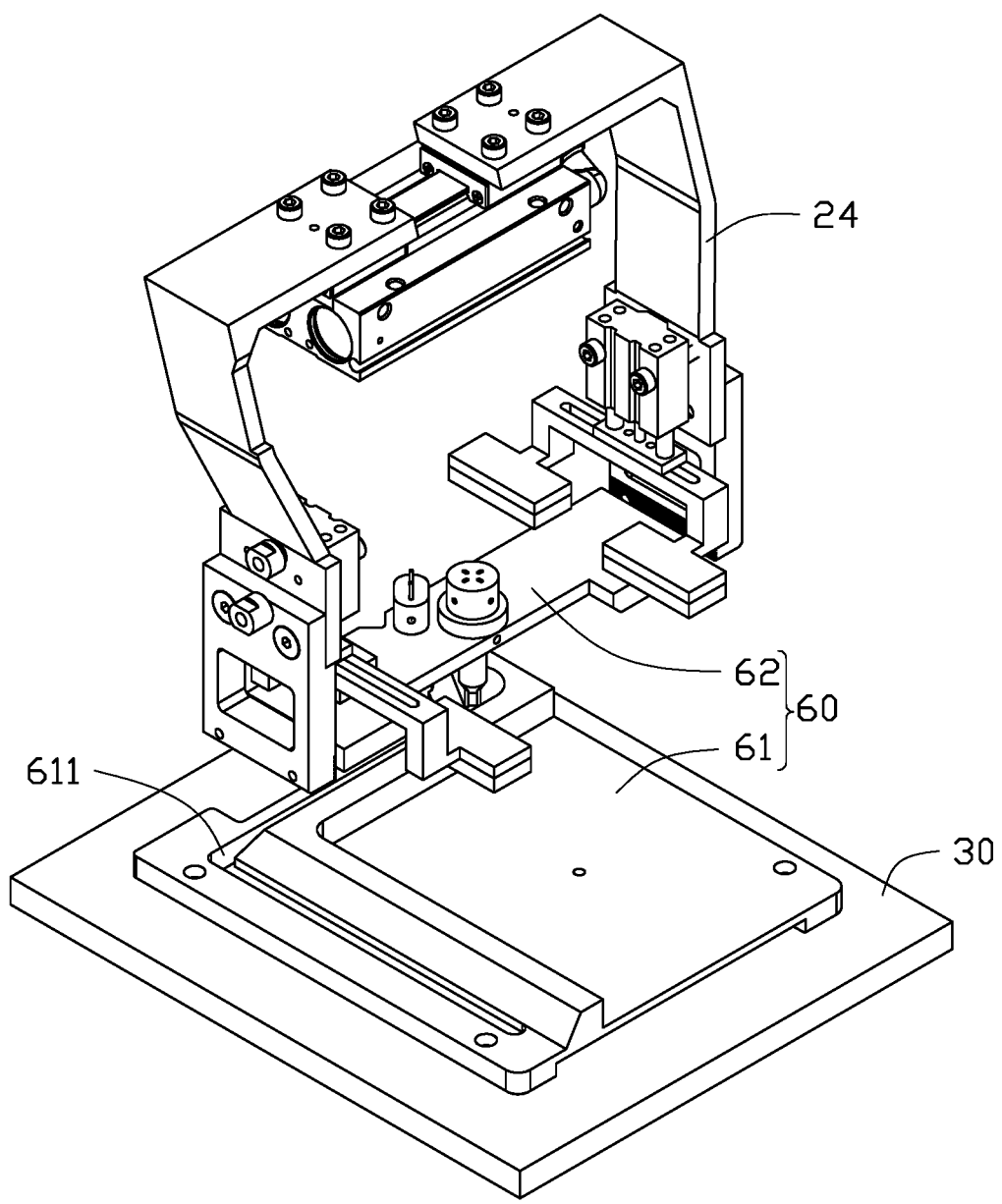
FIG. 6 is a isometric diagram of a positioning mold of the present disclosure.
Figure 7:
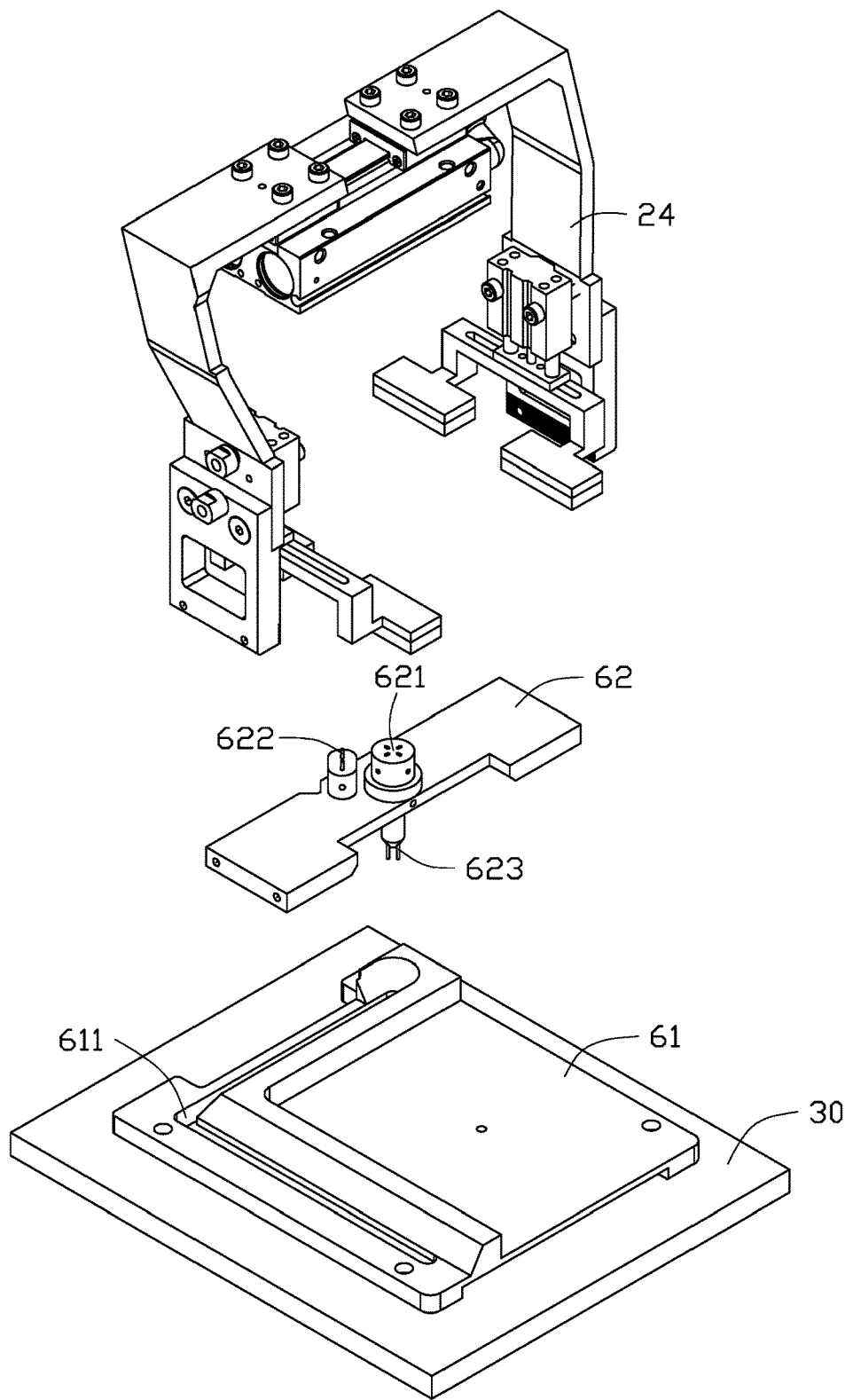
FIG. 7 is an exploded, isometric view of the positioning mold of FIG. 6.

FIGS. 6 and 7 illustrate the positioning mold 60. The positioning mold 60 comprises a fastening portion 61 and a moving portion 62. The fastening portion 61 is fixed to the platform 30 through a plurality of screws. An L-shaped rail 611 is defined on the fastening portion 61. The moving portion 62 is installed on the robotic arm 24. A level sensor 621 (based on sensing gravity) and a height sensor 622 are defined on the moving portion 62. The robotic arm 24 of the robot 20 drives the level sensor 621 to slide in the L-shaped rail 611 of the fastening portion 61. The level sensor 621 and the height sensor 622 each carry a probe 623. When the level sensor 621 slides in the L-shaped rail 611, the probe 623 obtains data from two edges of the L-shaped rail 611. The building module 11 creates a plane including the X and Y axes according to the data obtained by the probe 623 of the level sensor 621. The building module 11 creates the Z axis of the coordinate system according to the data obtained by the probe 623 of the height sensor 622.

At block 52, the interaction module 12 generates a reminder message after the coordinate system is created by the building module 11, and displays such message through the input/output unit 21. In response to the message user can place a guiding tool 71 on the platform 30 where the target objects 40 are located, and a fastening tool 72 used with the guiding tool 71 is arranged on the robotic arm 24 of the robot 20. When the user has completed operations required by the message, the interaction module 12 receives a feedback from the input/output unit 21.

Figure 8:
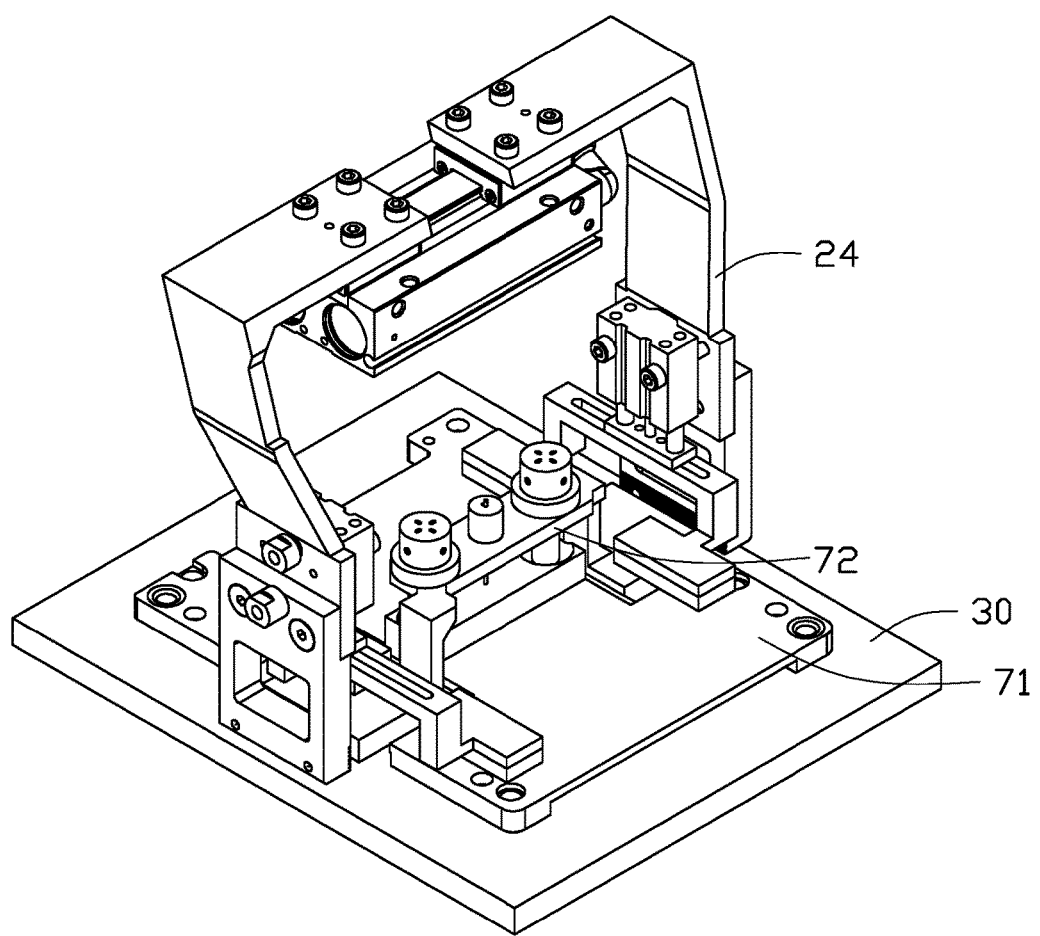
FIG. 8 is a isometric diagram of an embodiment of a guiding tool and a fastening tool used in the robot control system of the present disclosure.
Figure 9:
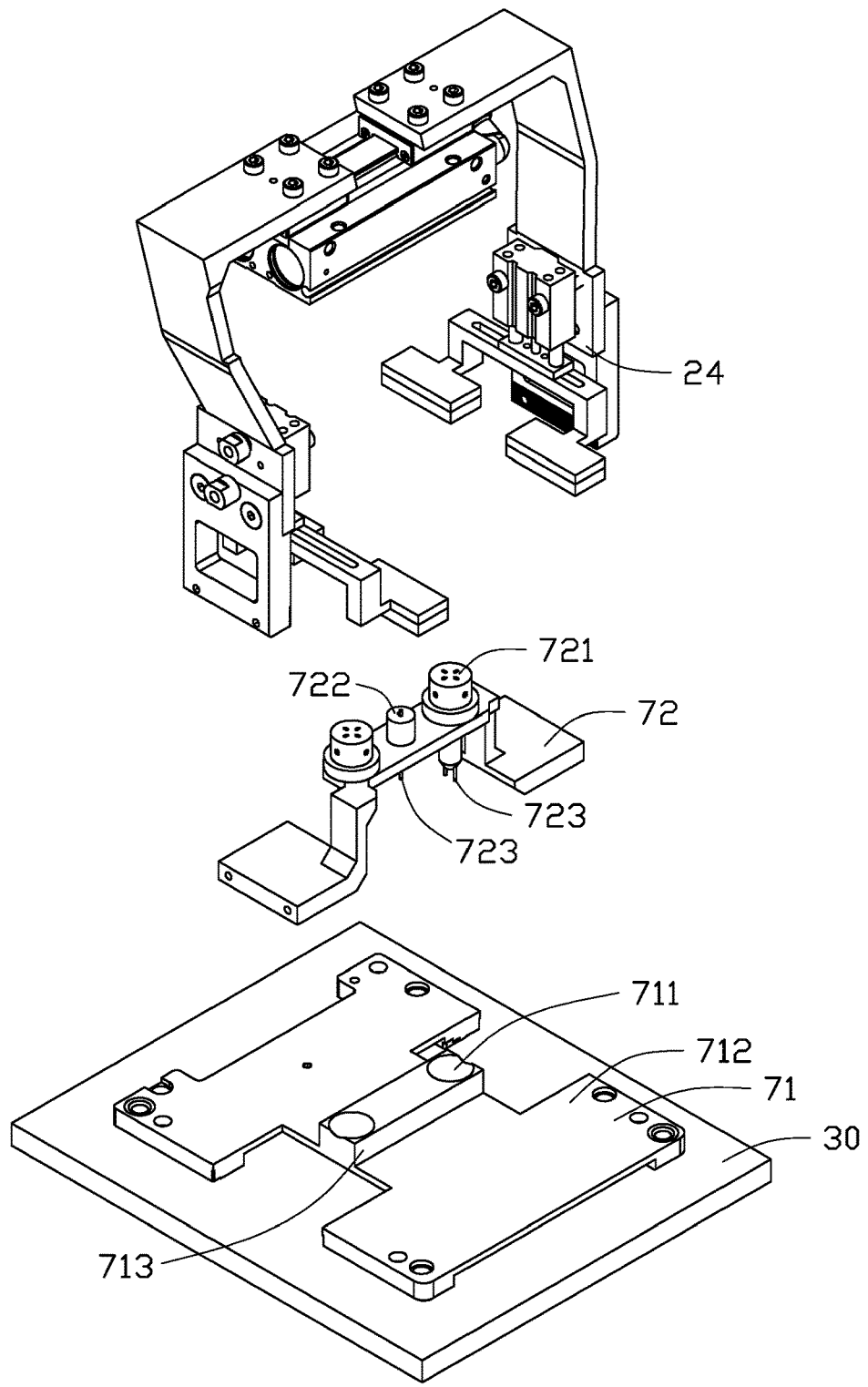
FIG. 9 is an exploded, isometric view of the components shown in FIG. 8.

FIGS. 8 and 9 illustrate a fastening tool 72 used with the guiding tool 71.

The guiding tool 71 is fixed in a position on the platform 30 through screws or locating studs (not shown in figures). The guiding tool 71 comprises a panel 712 and a convex block 713 placed in or on the panel 712. At least one locating hole 711 is defined in the convex block 713. In order to better determine the position of the robotic arm 24 when the robotic arm 24 is grasping a target object 40, the size and shape of the guiding tool 71 is equal to the size and shape of the target object 40.

Two level sensors 721 and a height sensor 722 are defined in the fastening tool 72. Two level sensors 721 are symmetrically placed about the two sides of the height sensor 722. Both the level sensors 721 and the height sensor 722 carry probes 723. In the illustrated embodiment, each level sensor 721 carries three probes 723, and the three probes 723 are placed on the circumference of one circle. Each probe 723 communicates with a signal control unit 25 of the robot 20. When the probe 723 touches the guiding tool 71, the signal control unit 25 connected to the probe 723 controls the input/output unit 21 to display a first signal, such as 1. Until the probe 723 touches with the guiding tool 71, the signal control unit 25 connected to the probe 723 controls the input/output unit 21 to display a second signal, such as 0.

In the illustrated embodiment, a diameter of the locating hole 711 can be a first preset value, such as 6.2 cms. Diameter of a circle marked by the three probes 723 of the level sensor 721 can be a second preset value, such as 6.0 cms. The first preset value is larger than the second preset value.

At block 53, when the interaction module 12 receives feedback from the input/output unit 21, the adjusting module 13, according to a predefined rule, adjusts the location of the fastening tool 72 relative to the guiding tool 71.

The adjusting module 13 adjusts the location of the fastening tool 72 relative to the guiding tool 71 according to the signals outputted by the signal control unit 25 which is connected to the probe 23. When the signal outputted by the signal control unit 25 is the first signal, the adjusting module 13 adjusts the location of the fastening tool 72 relative to the guiding tool 71 according to the predefined rule, to achieve the second signal in place of the first signal outputted by the signal control unit 25. The predefined rule can be to move one distance along the X, Y, or Z axes, or to rotate one distance along the Z axis. Each distance can be predefined and can change the location of the fastening tool 72 relative to the guiding tool 71 by a predefined value, such as 0.05 cm.

When only one signal control unit 25 (communicating with the probe 23 of the level sensor 721) outputs the first signal, the adjusting module 13 adjusts the location of the fastening tool 72 relative to the guiding tool 71 on the X or Y axes, in order that the signal control unit 25 outputs the second signal.

When two signal control units 25 output the first signal, the adjusting module 13 rotates the fastening tool 72 along the Z axis to adjust the location of the fastening tool 72 relative to the guiding tool 71, until the signal control unit 25 outputs the second signal.

When the input/output units communicating with the probe 23 of the height sensor 722 outputs the second signal, the adjusting module 13 adjusts the location of the fastening tool 72 relative to the guiding tool 71 on the Z axis, the signal control unit 25 outputting the first signal.

At block 54, the judging module 14 determines whether the location of the fastening tool 72 relative to the guiding tool 71 is correctly adjusted. If the location of the fastening tool 72 relative to the guiding tool 71 is correct, block 55 is implemented, otherwise the process returns to block 53.

In the illustrated embodiment, when all the probes 23 of the level sensor 721 of the fastening tool 72 does not touch with the guiding tool 71, and the probes 23 of the height sensor of the fastening tool 72 touches with the guiding tool 71. All of the signal control units 25 connected to the level sensor 721 output the second signal, and the signal control unit 25s connected to the height sensor 722 outputs the first signal. Thereby, the judging module 14 determines that the location of the fastening tool 72 relative to the guiding tool 71 is correctly adjusted, and the robotic arm 24 of the robot 20 can grasp the target objects 40 precisely and accurately.

At block 55, the receiving module 15 obtains the coordinates of the robotic arm 24 of the robot 20 when the location of the fastening tool 72 relative to the guiding tool 71 is correctly adjusted, and stores the coordinates of the robotic arm 24 of the robot 20.

While the disclosure has been described by way of example and in terms of a preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A robot control method comprising:
    creating a coordinate system based on a platform by a building module; wherein the platform supports target objects; wherein the coordinate system comprises X, Y, and Z axes, and a first plane defined by the X and Y axes is parallel with a second plane defined by the platform;
    generating a reminder command by an interaction module; wherein a guiding tool is placed in a position on the platform where the target objects are located, and a fastening tool used with the guiding tool is arranged on a robotic arm of a robot;

adjusting the location of the fastening tool relative to the guiding tool by an adjusting module; and determining a position of the robotic arm of the robot by a receiving module; wherein when the location of the fastening tool relative to the guiding tool is correctly adjusted, the receiving module determines the position of the robotic arm of the robot according to the location of the fastening tool;

wherein at least one locating hole is defined in the guiding tool, a first level sensor and a height sensor are located in the fastening tool, at least one probe is located in the first level sensor and the height sensor, and each probe is coupled to a input/output unit of the robot;

creating the coordinate system based on a positioning mould of the platform by the building module; wherein the positioning mould comprises a fastening portion and a moving portion, the fastening portion fixes with the platform, the fastening portion comprises an L-shaped rail, the moving portion is installed on the robotic arm of the robot; the moving portion comprises a second level sensor, and the robotic arm of the robot drives the second level sensor to slide in the L-shaped rail of the fastening portion.

2. The robot control method of claim 1, wherein the input/output unit connected to the at least one probe in the first level sensor outputs a first signal when the at least one probe in the first level sensor touches the guiding tool; the input/output unit connected to the at least one probe in the first level sensor outputs a second signal when the at least one probe in the first level sensor does not touch the guiding tool.

3. The robot control method of claim 2, wherein the adjusting module adjusts the location of the fastening tool relative to the guiding tool according to a predefined rule; the predefined rule is configured for adjusting the location of the fastening tool relative to the guiding tool according to the signal outputted by the input/output unit, the input/output unit is coupled to the at least one probe in the first level sensor.

4. The robot control method of claim 3, wherein when the input/output unit coupled with the at least one probe of the first level sensor outputs the first signal, the adjusting module adjusts the location of the fastening tool relative to the guiding tool on the X and Y axes, and the input/output unit outputs the second signal.

5. The robot control method of claim 3, wherein when the input/output unit coupled with the at least one probe of the height sensor outputs the second signal, the adjusting module adjusts the location of the fastening tool relative to the guiding tool on the Z axis, and the input/output unit outputs the first signal.

6. A robot control system comprising:
a building module configured for creating a coordinate system based on a platform, wherein the platform can support target objects; wherein the coordinate system comprises X, Y, and Z axes, and a first plane defined by the X and Y axes is parallel with a second plane defined by the platform;

an interaction module configured for generating a reminder command; wherein a guiding tool is placed in a position on the platform where the target objects are located, and a fastening tool used with the guiding tool is arranged on a robotic arm of a robot;

an adjusting module adjusting the location of the fastening tool relative to the guiding tool according to a predefined rule; and a receiving module configured for determining a position of the robotic arm of the robot according to the location of the fastening tool when the location of the fastening tool relative to the guiding tool is correctly adjusted;

wherein at least one locating hole is defined in the guiding tool, a first level sensor and a height sensor are located in the fastening tool, at least one probe is located in the first level sensor and the height sensor, and each probe is coupled to an input/output unit of the robot;

wherein the building module creates the coordinate system based on a positioning mould of the platform; and wherein the positioning mould comprises a fastening portion and a moving portion, the fastening portion fixes with the platform, the fastening portion comprises an L-shaped rail, the moving portion is installed on the robotic arm of the robot the moving portion comprises a second level sensor, the robotic arm of the robot drives the second level sensor to slide in the L-shaped rail of the fastening portion.

7. The robot control system of claim 6, wherein the input/output unit connected to the at least one probe in the first level sensor outputs a first signal when the at least one probe in the first level sensor touches the guiding tool; the input/output unit connected to the at least one probe in the first level sensor outputs a second signal when the at least one probe in the first level sensor does not touch the guiding tool.

8. The robot control system of claim 7, wherein the predefined rule is configured for adjusting the location of the fastening tool relative to the guiding tool according to the signal outputted by the input/output unit, the input/output unit is coupled to the at least one probe in the first level sensor.

9. The robot control system of claim 8, wherein when the input/output unit coupled with the at least one probe of the first level sensor outputs the first signal, the adjusting module adjusts the location of the fastening tool relative to the guiding tool on the X and Y axes, and the input/output unit outputs the second signal.

10. The robot control system of claim 8, wherein when the input/output unit coupled with the at least one probe of the height sensor outputs the second signal, the adjusting module adjusts the location of the fastening tool relative to the guiding tool on the Z axis, and the input/output unit outputs the first signal.

* * * * *